Oct. 2, 1956
T. F. McHENRY
2,765,438
SATURABLE REACTOR CONTROL
Filed Jan. 8, 1953
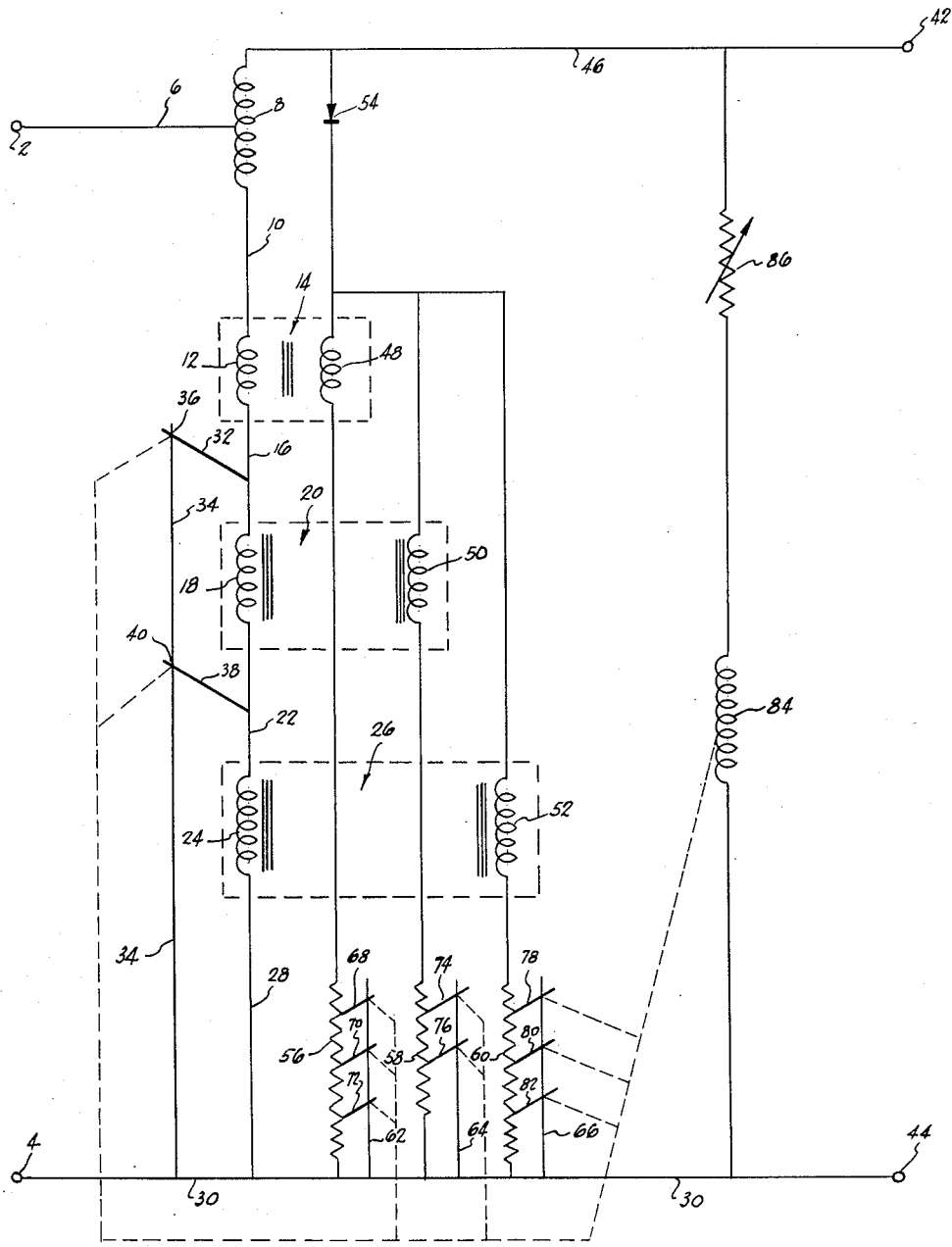
INVENTOR
THOMAS F. McHENRY
BY
James and Franklin
ATTORNEYS

United States Patent Office 2,765,438
Patented Oct. 2, 1956

2,765,438

SATURABLE REACTOR CONTROL

Thomas F. McHenry, New Canaan, Conn., assignor to Electric Regulator Corporation, South Norwalk, Conn., a corporation of New York Application January 8, 1953, Serial No. 330,246

26 Claims. (Cl. 323—66)

The present invention relates to a novel method and circuit arrangement for utilizing saturable reactors to control the output of an electrical circuit, and in particular to an efficient and effective way of achieving control over a wide range.

The advantages of saturable reactors as control instrumentalities in electrical circuits are well recognized. They have been employed in many applications, including self-regulating circuits. The saturable reactor essentially consists of a pair of magnetically linked windings, hereinafter termed an impedance winding and a saturating winding. The impedance winding is adapted to be connected in the circuit to be controlled, the saturating winding being energized and the degree of energization thereof controlling the magnetic status of a core surrounded by the impedance winding. The magnetic status of this core will determine the effective value of the impedance winding. When the core is fully saturated, as when the saturating winding is fully energized, the impedance winding will have a low value. As the energization of the saturating winding decreases the magnetic status of the core will recede from saturation and the impedance winding will increase in value. It will be seen, therefore, that a certain amount of power must be consumed in the saturating winding in order to control and vary the impedance of the impedance winding. It will further be apparent that the greater the range over which the value of the impedance winding is to be varied, the greater is the required degree of variation in energization of the saturating winding.

It is this last feature which has presented a most significant drawback to the use of saturable reactors in certain installations where a wide range of control is required. If the range of impedance variation is doubled, the required range of variation in energization of the saturating winding must be increased by a considerably greater degree than two-fold. Our investigations indicate that the required variation in energization of the saturating winding, in terms of the power required, will increase almost as the square of the desired impedance range. These power requirements are significant from the point of view of actual circuit efficiency, particularly in self-regulated circuits. They are also extremely important from the point of view of initial cost, because they require the designing of the reactors so as to be able to handle and dissipate the power in question. This involves the use of massive amounts of iron and copper.

Therefore, while the construction of a saturable reactor the impedance winding of which can have a value variable in the range of 1:3 can be accomplished without any difficulty, and without producing an excessively bulky, heavy or expensive unit, it is impractical to produce such a reactor the impedance values of which are variable over the range of 9:1, and when an impedance range of 27:1 is involved, the consequent mechanical and electrical problems become completely out of hand from any realistic point of view.

Another important factor which must be considered is the maximum value of current which the impedance winding will be called upon to carry. When the impedance of that winding is low an appreciable current will pass through it, and consequently its turns must be massive enough to carry that current. As the impedance of the winding increases, that is to say, as the energization of the saturating winding decreases, the current passing through the impedance winding will decrease, and hence much of the copper in the impedance winding will be unnecessary. The cost of the copper is an exceedingly important factor in the overall cost of the reactor, so any expedient which will permit the use of a smaller amount of copper is economically advantageous. Moreover, the copper contributes greatly to the bulk and weight of the unit, and here again reduction in the amount of copper is a prime desideratum. It will be understood that the greater the range over which the impedance of the reactor is to be varied, the more excess copper is contained in the impedance winding of that reactor when it is operating above its minimum value.

Economy in the use of copper is also a factor, although perhaps to a lesser degree, in the saturating winding. The greater the maximum amount of power which must be employed in the saturating winding in order to impart to the impedance winding the desired range in impedance variation, the more massive must be the saturating winding. The greater the range of power required in the saturating winding, the more excess copper will be utilized in that winding when it is operating at reduced energization.

The present invention teaches the attainment of an exceedingly wide range of control without sacrifice of any of the advantages inherent in the use of a saturable reactor, but at less cost than has previously been thought possible, with the utilization of smaller amounts and lesser range of variation of power in the saturating windings, and with a minimization of the bulk and weight of the reactor system. This is accomplished by utilizing a plurality of reactors instead of a single reactor, the impedance windings of each of the individual reactors being connected in the circuit to be controlled in such a manner that they are sequentially and cumulatively rendered effective in that circuit, the impedance winding of the second reactor becoming part of the circuit only after the impedance winding of the first reactor has achieved its maximum degree of impedance, said impedance winding of the second reactor being effectively inserted into the control circuit when it has a low impedance value, its impedance value thereafter being progressively increased. Each individual reactor can therefore have an effective impedance range which is but a fraction of the total range of impedance variation desired. Hence each individual reactor may be comparatively small and inexpensive, with a small amount of copper and a small power consumption when compared with the characteristics which would be required in a single reactor which would have a comparable impedance range.

Since the impedance winding of the second reactor is not connected into the circuit until the impedance winding of the first reactor has reached its maximum value, the maximum current which will have to be carried by the impedance winding of the second reactor will be appreciably less than the maximum current which has to be carried by the impedance winding of the first reactor. Consequently the wire used in the impedance winding of the second reactor may be much smaller than that used in the impedance winding of the first reactor, this factor alone giving rise to great economy in the use of copper.

In order to achieve the above arrangement, it is proposed to provide a short circuiting connection around the impedance winding of the second reactor, that connection including a switch which may be opened when the second reactor is to be rendered operative. Particularly in automatic regulation systems, where such a switch might be required to function quite frequently, the life of the engaging switch contacts is quite significant. We have found that while in most cases contacts can be made massive enough to carry the currents involved, the main cause of breakdown of the switch contacts is the voltage applied across the contacts at the instant that they open. In order to minimize this voltage, and therefore increase the capability and life of the system, it is proposed to open the switch in question, and thus render the second reactor operative, when the saturating winding thereof is sufficiently energized so as to substantially fully saturate the impedance winding, the latter then having a minimum impedance, so that a minimum voltage is applied across the switch contacts when they open.

The above general description has dealt with the use of a pair of reactors but it will be obvious that any number of reactors may be employed, the third reactor being rendered operative, preferably when fully saturated, after the impedance of the second reactor has been maximized, and so on.

To the accomplishment of the above, and to such other objects as may hereinafter appear, the present invention relates to the method and circuit arrangement for controlling the useability of an electrical circuit as here disclosed and claimed and as described in this specification, taken together with the drawing, which discloses a system utilizing three reactors and effective to provide automatic voltage regulation.

The drawing discloses a circuit having input terminals 2 and 4 between which an alternating current source is connected. Lead 6 connects the terminal 2 to an intermediate point on coil 8, the lower end of the coil 8 being connected by means of lead 10 to the impedance winding 12 of a first saturable reactor 14, then by lead 16 to the impedance winding 18 of a second saturable reactor 20, then by lead 22 to the impedance winding 24 of a third saturable reactor 26, and then by leads 28 and 30 to the terminal 4. The impedance winding 18 of the second reactor 20 is short-circuited by connector 32 and lead 34 meeting at switch point 36, and the impedance winding 24 of the third reactor 26 is short-circuited by connector 38 and lead 34 meeting at the switch point 40. This defines the input circuit of the system disclosed. That system also includes a pair of output terminals 42 and 44 across which a load may be connected, the terminal 42 being connected by lead 46 to the upper end of coil 8 and the terminal 44 being connected by leads 30 and 28, winding 24, lead 22, winding 18, lead 16, winding 12 and lead 10 to the lower end of coil 8. It will be recognized that the thus defined output circuit is electromagnetically related to the input circuit, the coil 8 functioning as an auto-transformer. It will be understood that any other type of transformer or linkage could be employed.

The reactors 14, 20 and 26 are provided with saturating windings 48, 50 and 52 respectively. Since these windings must ordinarily be supplied with direct current, they are connected between the A. C. output leads 30 and 46 via a rectifier 54. Since the system here disclosed is designed to maintain the A. C. voltage between the leads 30 and 46 substantially constant, it is entirely permissible to utilize this manner of connection. Of course, some external source of D. C. energization could be employed if desired.

A variable resistance 56 is connected in series with the saturating winding 48, a variable resistance 58 is connected in series with the saturating winding 50 and a variable resistance 60 is connected in series with the saturating winding 52, each associated pair of saturating windings and variable resistances being connected in parallel with one another. As here disclosed each of the resistances is provided with a short-circuiting bar 62, 64 and 66 respectively, and with a plurality of switch fingers 68, 70 and 72, 74 and 76, and 78, 80 and 82 respectively, each normally engaging its respective short-circuiting bar 62, 64 or 66 and being connected to a selected point along its associated resistance 56, 58 or 60. The precise points of connection of the switch fingers to their respective resistances will vary with the design of each installation.

Having reference by way of example to resistance 56, when all the switch fingers 68, 70 and 72 are engaged with the short-circuiting bar 62, the resistance 56 will have a minimum value, most or all of it being short-circuited. When the switch finger 68 is lifted from the short-circuiting bar 62, an additional segment of that resistance 56 will be effectively inserted into the circuit, the overall resistance thus increasing. An additional increment of resistance will be added when the finger 70 is lifted, and yet another increment of resistance will be added when the finger 72 is lifted. The same is true with respect to the other resistances 58 and 60 and their respective switch fingers 74, 76 and 78, 80, 82 respectively. The connectors 32 and 38 which connect the upper ends of the impedance windings 18 and 24 to the short-circuiting lead 34 may also include similar switch fingers normally urged into electrical connection with the lead 34.

When the elements of the system as thus far set forth are in their normal position as shown in the drawings, all of the saturating windings 48, 50 and 52 are energized, the resistances 56, 58 and 60 respectively in series therewith being at their minimum values so that the energization of the saturating windings are maximized. These energizations are preferably sufficient to substantially fully saturate the impedance windings 12, 18 and 24, those windings therefore having their minimum values. Only the impedance winding 12 of the first reactor 14 is in the circuit, the impedance windings 18 and 24 of the second and third reactors 20 and 26 respectively being short-circuited by the lead 34 and the connectors 32 and 38 respectively. Thus a minimum amount of control impedance is inserted in the circuit.

Assuming that the input voltage remains constant and it is desired to decrease the output voltage between the terminals 42 and 44, the effective energization of the saturating winding 48 is progressively decreased, as by increasing the effective resistance of the resistor 56 by sequentially lifting the switch fingers 68, 70 and 72 from the short-circuiting bar 62. As this is done the current passing through the saturating winding 48 will decrease, the degree of saturation of the impedance winding 12 will decrease, the impedance of that winding will increase, and hence the output voltage will decrease.

After the first reactor 14 has been caused to have its full effect, the impedance of the winding 12 varying, for example, over a range of 1:3, the switch point 36 is opened, thus inserting into the circuit the impedance winding 18, which is preferably fully saturated and hence has its minimum impedance value. The addition of this increment of impedance in the circuit will result in a further decrease in the output voltage. The switch fingers 74 and 76 may then be sequentially lifted from the short-circuiting bar 64, thus decreasing the current through the saturating winding 50, reducing the saturation of the impedance winding 18, and causing its impedance to increase, thus further lowering the output voltage.

After the impedance of the winding 18 has thus been caused to vary over its designed range, the switch 40 is opened, inserting into the circuit the impedance winding 24 which, like the impedance winding 18 at the instant when it was first inserted into the circuit, is preferably fully saturated so that its impedance is at a minimum. This added increment of impedance will still further lower the output voltage. Thereafter, the switch fingers 78, 80 and 82 are sequentially lifted from the short circuiting bar 66, thus decreasing the current through the saturating winding 52, decreasing the degree of saturation of the impedance winding 24, increasing the impedance of the winding 25, and hence further decreasing the output voltage.

Through the use of the three reactors 14, 20 and 26 an extremely wide range of variation in output voltage is effected, but each individual reactor has its impedance varied over but a fraction of that total range. When the control impedance is at a minimum, at the start of the above described sequence of operations, the current through the input circuit is at a maximum, but that current passes only through the impedance winding 12. When the impedance winding 18 is connected into the circuit the impedance of the winding 12 has reached its maximum value and consequently the input current has decreased. Therefore the wire in the winding 18 may be smaller than the wire in the winding 12, since it will never be called upon to carry as much current. When the winding 24 is connected into the circuit the current in that circuit will be still further reduced because the impedance of the windings 12 and 18 will both be at a maximum and will be additive in effect. Hence the wire in the winding 24 may be even smaller than the wire in the winding 18. In addition, at the instant that each of the switches 36 and 40 are opened, the impedance across those switch points, to wit, the windings 18 and 24 respectively, will preferably be at their minimum impedance values, thus minimizing the voltage impressed across those switch points at the instant of break and hence maximizing the life of said switch points.

The above sequence of operation of the various switching devices is preferably accomplished by a single control means operatively connected to the switches 36 and 40 and to the resistances 56, 58 and 60. That control means may take any of a wide variety of forms and may, if desired, be manually controlled so that the output voltage can be adjusted to any desired value. It is preferred, however, to provide for automatic control by utilizing an instrumentality connected to the output circuit, sensitive to a given parameter thereof, such as voltage or current, and effective to carry out all or a part of the sequence of operations as above described, either in the same sense as described or in the opposite sense, in accordance with the variations in that parameter. One such instrumentality is the device disclosed in Patent No. 2,580,732 and entitled "Finger Type Circuit Regulator," obtained by Arthur M. Cohen, that piece of equipment having exceptionally advantageous characteristics for the automatic control of current or voltage. However, many other types of sequential switches or relays could be employed in the present invention.

For the automatic control of voltage, as illustrated in the drawings, a coil 84 is connected between the output leads 30 and 46, preferably in series with a variable resistance 86. Once the resistance 86 is set, thus fixing the nominal value of output voltage, variations in voltage between the leads 30 and 46 will cause a change in energization of the coil 84, and this change in energization is translated by an appropriate mechanical or electrical apparatus, such as an electromagnetically attracted armature, so as to give rise to the following sequence of operations as the energization of the coil 84 increases: sequentially lift switch fingers 68, 70 and 72, open switch 36, sequentially lift switch fingers 74 and 76, open switch 40 and sequentially lift switch fingers 78, 80 and 82. The same sequence, but in the opposite sense, is performed as the energization of the coil 84 decreases.

The automatic voltage regulating system as disclosed is capable of maintaining the output voltage constant despite variation in the input voltage or in the load. When the load is high and the input voltage is low, the system will be in the condition disclosed, with all of the switches closed. If the input voltage should increase, the energization of the coil 84 will increase and the sequence of operations as above described will take place until the output voltage is brought back to its nominal value. If the load should decrease, the same sequence of operations will take place.

By reason of the present invention we are enabled to use a saturable reactor control system which will provide for control or regulation over an exceedingly wide range, a much wider range than has heretofore been thought practicable while using saturable reactors. We attain this result because we employ a plurality of individual reactors connected as disclosed, each reactor having an impedance range which is but a small fraction of the total impedance range required. By so doing we greatly reduce the amount of copper required in the reactor system, we greatly reduce the bulk and weight of the reactors, we greatly reduce the cost of the reactors, and we also greatly reduce the power consumption and range of control power required.

While but a single embodiment of the present invention has been here specifically disclosed, it will be apparent that many variations may be made therein in the specific circuit arrangement, the sensed output parameter, the manner in which the values of the resistances 56, 58 and 60 are varied or the energization of the saturating windings 48, 50 and 52 is otherwise controlled, and the specific transducing arrangement for translating variations in a signal, however derived, into the sequence of operations set forth, all without departing from the spirit of the invention as defined in the following claims.

I claim:

1. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, a first variable resistance in series with the saturating winding of said first reactor, a second variable resistance in series with the saturating winding of said second reactor, both of said resistances normally assuming a minimum value, each of said saturating windings and their respective variable resistances being connected to a D. C. source, and a single control means operatively connected to said variable resistances and said switch and effective to operate them in the following sequence in a given sense of operation of said control means: progressively increase said first variable resistance to a predetermined maximum value, open said switch, and progressively increase said second variable resistance to a predetermined maximum value.

2. The control arrangement of claim 1, in which but a single D. C. source is employed, said saturating windings and their respective variable resistances being connected in parallel with one another and in series with said single D. C. source.

3. The control arrangement of claim 2, in which said single control means is operatively connected to the output of said circuit and is sensitive to a given parameter thereof, variation of said parameter in a given sense causing operation of said control means in a given sense.

4. The control arrangement of claim 1, in which said single control means is operatively connected to the output of said circuit and is sensitive to a given parameter thereof, variation of said parameter in a given sense causing operation of said control means in a given sense.

5. A control arrangement for varying the output of a circuit comprising an input, an output and a variable impedance connected therebetween, said arrangement comprising a pair of saturable reactors each including an impedance winding and a saturating winding, said impedance windings being connected in said circuit and defining said variable impedance, a first resistance in series with the saturating winding of said first reactor, a first series of short-circuiting connections across selected portions of said first resistance, each of said connections including a normally closed switch, a short-circuiting connection around the impedance winding of said second reactor, a normally closed switch in said connection, a second resistance in series with the saturating winding of said second reactor, a second series of short-circuiting connections across selected portions of said second resistance, each of said connections including a normally closed switch, each of said saturating windings and their respective resistances being connected to a D. C. source, and a single control means operatively connected to said switches and effective to sequentially open them in the following sequence in a given sense of operation of said control means: said switches in said first series of connections sequentially, the switch in the connection around said second reactor, and then said switches in said second series of connections sequentially.

6. The control arrangement of claim 5, in which but a single D. C. source is employed, said saturating windings and their respective resistances being connected in parallel with one another and in series with said single D. C. source.

7. The control arrangement of claim 6, in which said single control means is operatively connected to the output of said circuit and is sensitive to a given parameter thereof, variation of said parameter in a given sense causing operation of said control means in a given sense.

8. The control arrangement of claim 5, in which said single control means is operatively connected to the output of said circuit and is sensitive to a given parameter thereof, variation of said parameter in a given sense causing operation of said control means in a given sense.

9. An A. C. regulation system comprising an A. C. input, a transformer having a primary winding in series with said input, an A. C. output, a secondary winding of said transformer in series with said A. C. output, first and second saturable reactors each having an impedance winding and a saturating winding, said impedance windings being connected in series with one another and with said primary, each of said saturating windings being connected to a D. C. source, a short-circuiting connection including a switch around the impedance winding of said second reactor, first and second independently variable resistances connected in series with the saturating windings of said first and second reactors respectively, a parameter-sensing instrumentality connected to said output, and an operative connection between said instrumentality and said switch and variable resistances effective to operate the latter in the following sequence as said parameter increases: progressively increase said first variable resistance to a predetermined maximum value, open said switch, and progressively increase said second variable resistance to a predetermined maximum value.

10. The control arrangement of claim 9, in which but a single D. C. source is employed, said saturating windings and their respective variable resistances being connected in parallel with one another and in series with said single D. C. source.

11. The regulation system of claim 10, in which said instrumentality is effective to sense the voltage of said output, said system maintaining said voltage substantially constant, and in which said saturating windings are connected to said output via a rectifier, said voltage-regulated output and said rectifier constituting said D. C. source.

12. The regulation system of claim 9, in which said instrumentality is effective to sense the voltage of said output, said system maintaining said voltage substantially constant, and in which said saturating windings are connected to said output via a rectifier, said voltage-regulated output and said rectifier constituting said D. C. source.

13. An A. C. regulation system comprising an A. C. input, a transformer having a primary winding in series with said input, an A. C. output, a secondary winding of said transformer in series with said A. C. output, first and second saturable reactors each having an impedance winding and a saturating winding, said impedance windings being connected in series with one another and with said trasformer primary, each of said saturating windings being connected to a D. C. source, a first resistance in series with the saturating windings of said first reactor, a first series of short-circuiting connections across selected portions of said first resistance, each of said connections including a normally closed switch, a short-circuiting connection around the impedance winding of said second reactor, a normally closed switch in said connection, a second resistance in series with the saturating winding of said second reactor, a second series of short-circuiting connections across selected portions of said second resistance, each of said connections including a normally closed switch, each of said saturating windings and their respective resistances being connected to a D. C. source, a parameter-sensing instrumentality connected to said output, and an operative connection between said instrumentality and said switches and effective to operate them in the following sequence as said parameter increases: said switches in said first series of connections sequentially, the switch in the connection around said second reactor, and then said switches in said second series of connections sequentially.

14. The control arrangement of claim 13, in which but a single D. C. source is employed, said saturating windings and their respective variable resistances being connected in parallel with one another and in series with said single D. C. source.

15. The regulation system of claim 14, in which said instrumentality is effective to sense the voltage of said output, and in which said saturating windings are connected to said output via a rectifier, said voltage-regulated output and said rectifier constituting said D. C. source.

16. The regulation system of claim 13, in which said instrumentality is effective to sense the voltage of said output, and in which said saturating windings are connected to said output via a rectifier, said voltage-regulated output and said rectifier constituting said D. C. source.

17. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, first variable means for energizing the saturating winding of said first reactor, second variable means for energizing the saturating winding of said second reactor, control means operatively connected to said first variable means for varying the energization of the saturating winding of said first reactor, control means operatively connected to said variable means for varying the energization of the saturating winding of said second reactor, and control means operatively connected to said switch and effective to open and close the latter.

18. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, first variable means for energizing the saturating winding of said first reactor, second variable means for energizing the saturating winding of said second reactor, and a single control means operatively connected to said first and second variable means and to said switch and effective to vary the energization of said first and second means and open and close said switch.

19. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, first variable means for energizing the secondary winding of said first reactor, second variable means for energizing the saturating winding of said second reactor, and a single control means operatively connected to said first and second variable means and to said switch and effective to vary the energization of said first and second means and open and close said switch in accordance with the following sequence in a given sense of operation of said control means, said switch being initially closed and said variable means initially energizing their respective saturating windings to a predetermined value: progressively decrease the energization of the saturating winding of said first reactor, open said switch, and progressively decrease the energization of the saturating winding of said second reactor.

20. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, first variable means for energizing the saturating winding of said first reactor, second variable means for energizing the saturating winding of said second reactor, and a single control means operatively connected to said first and second variable means and to said switch and effective to vary the energization of said first and second means and open and close said switch in accordance with the following sequence in a given sense of operation of said control means, said switch being initially closed and said variable means initially energizing their respective saturating windings to a predetermined maximum value such that said reactors are substantially saturated: progressively decrease the energization of the saturating winding of said first reactor, open said switch, and progressively decrease the energization of the saturating winding of said second reactor.

21. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, first variable means for energizing the secondary winding of said first reactor, second variable means for energizing the saturating winding of said second reactor, and control means operatively connected to said first and second variable means and to said switch and effective to vary the energization of said first and second means and open and close said switch in accordance with the following sequence in a given sense of operation of said control means, said switch being initially closed and said variable means initially energizing their respective saturating windings to a predetermined value: progressively decrease the energization of the saturating winding of said first reactor, open said switch, and progressively decrease the energization of the saturating winding of said second reactor.

22. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, first variable means for energizing the saturating winding of said first reactor, second variable means for energizing the saturating winding of said second reactor, and control means operatively connected to said first and second variable means and to said switch and effective to vary the energization of said first and second means and open and close said switch in accordance with the following sequence in a given sense of operation of said control means, said switch being initially closed and said variable means initially energizing their respective saturating windings to a predetermined maximum value such that said reactors are substantially saturated: progressively decrease the energization of the saturating winding of said first reactor, open said switch, and progressively decrease the energization of the saturating winding of said second reactor.

23. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, a first variable resistance in series with the saturating winding of said first reactor, a second variable resistance in series with the saturating winding of said second reactor, both of said resistances normally assuming a minimum value, each of said saturating windings and their respective variable resistances being connected to a D. C. source, and control means operatively connected to said variable resistance and said switch and effective to vary said resistance and open and close said switch.

24. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, a first variable resistance in series with the saturating winding of said first reactor, a second variable resistance in series with the saturating winding of said second reactor, both of said resistances normally assuming a minimum value, each of said saturating windings and their respective variable resistances being connected to a D. C. source, and a single control means operatively connected to said variable resistances and said switch and effective to vary said resistances and open and close said switch in a predetermined sequence.

25. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, a first variable resistance in series with the saturating winding of said first reactor, a second variable resistance in series with the saturating winding of said second reactor, both of said resistances normally assuming a minimum value, each of said saturating windings and their respective variable resistances being connected to a D. C. source, and a single control means operatively connected to said variable resistances and said switch and effective to vary said resistances and open and close said switch in a predetermined sequence, said switch initially being closed and said resistances initially being at predetermined minimum values.

26. A control arrangement for varying the output of a circuit comprising an input, an output, and a variable impedance connected therebetween, said arrangement comprising a pair of saturable reactors each including an impedance winding and a saturating winding, said impedance windings being connected in said circuit and defining said variable impedance, a short-circuiting connection including a switch around the impedance winding of said second reactor, a first variable resistance in series with the saturating winding of said first reactor, a second variable resistance in series with the saturating winding of said second reactor, both of said resistances normally assuming a minimum value, each of said saturating windings and their respective variable resistances being connected to a D. C. source, and a single control means operatively connected to said variable resistances and said switch and reffective to vary said resistances and open and close said switch in a predetermined sequence, said switch initially being closed and said resistances initially being at predetermined minimum values such that said reactors are substantially saturated.

References Cited in the file of this patent

UNITED STATES PATENTS

| | | |
|---|---|---|
| 1,931,799 | Hunter | Oct. 24, 1933 |
| 2,220,415 | La Roque | Nov. 5, 1940 |
| 2,432,036 | Noxon | Dec. 2, 1947 |